United States Patent

[11] 3,633,851

[72] Inventor Egon Marte
 2335 Argonne Drive, Minneapolis, Minn. 55421
[21] Appl. No. 9,616
[22] Filed Feb. 9, 1970
[45] Patented Jan. 11, 1972

[54] OVERRIDE DUAL CONTROL DEVICE FOR AIRCRAFT
 6 Claims, 2 Drawing Figs.

[52] U.S. Cl.................................................... 244/84, 74/494
[51] Int. Cl....................................................... B64c 13/12
[50] Field of Search........................................... 74/494; 244/84; 180/77 C

[56] References Cited
 UNITED STATES PATENTS
 2,163,114  6/1939  Ziegler ........................ 244/84
 FOREIGN PATENTS
 23,922  12/1911  Great Britain................ 244/84
 334,401  9/1930  Great Britain................ 244/84

*Primary Examiner*—Milton Kaufman
*Attorney*—John W. Adams

ABSTRACT: This invention is a dual control device for aircraft in which the student's control system includes a yieldable spring release mechanism so that the instructor may take over full control of the airplane if the student becomes panicked and "freezes" by pulling his control tightly towards himself.

PATENTED JAN 11 1972
3,633,851
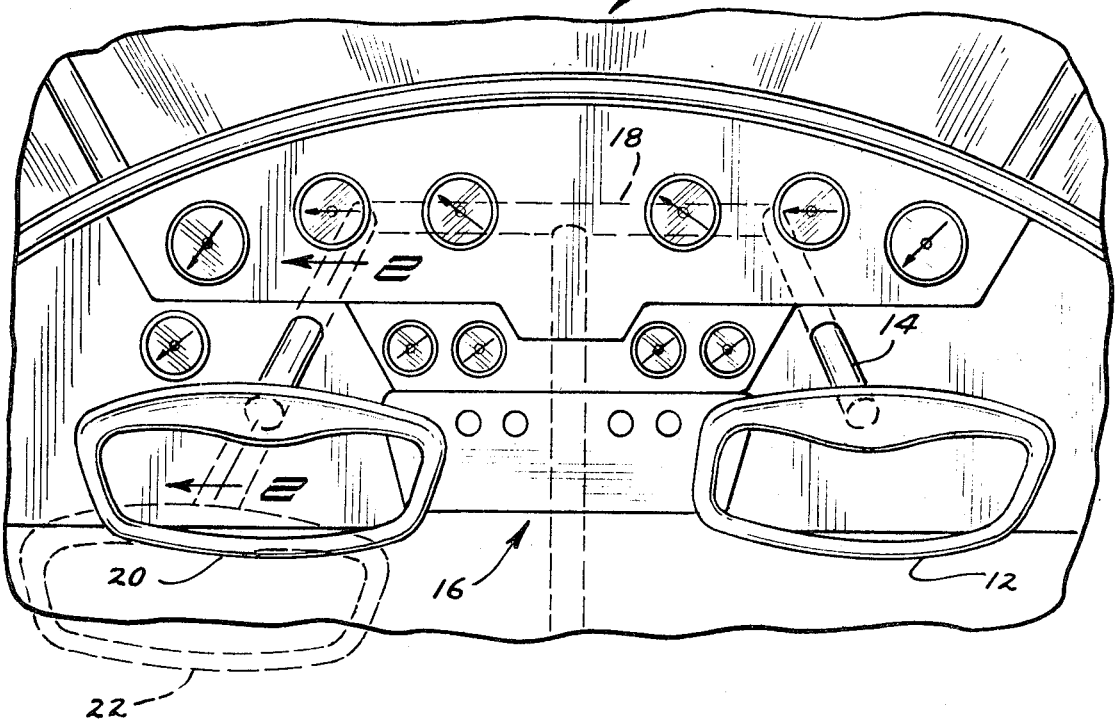
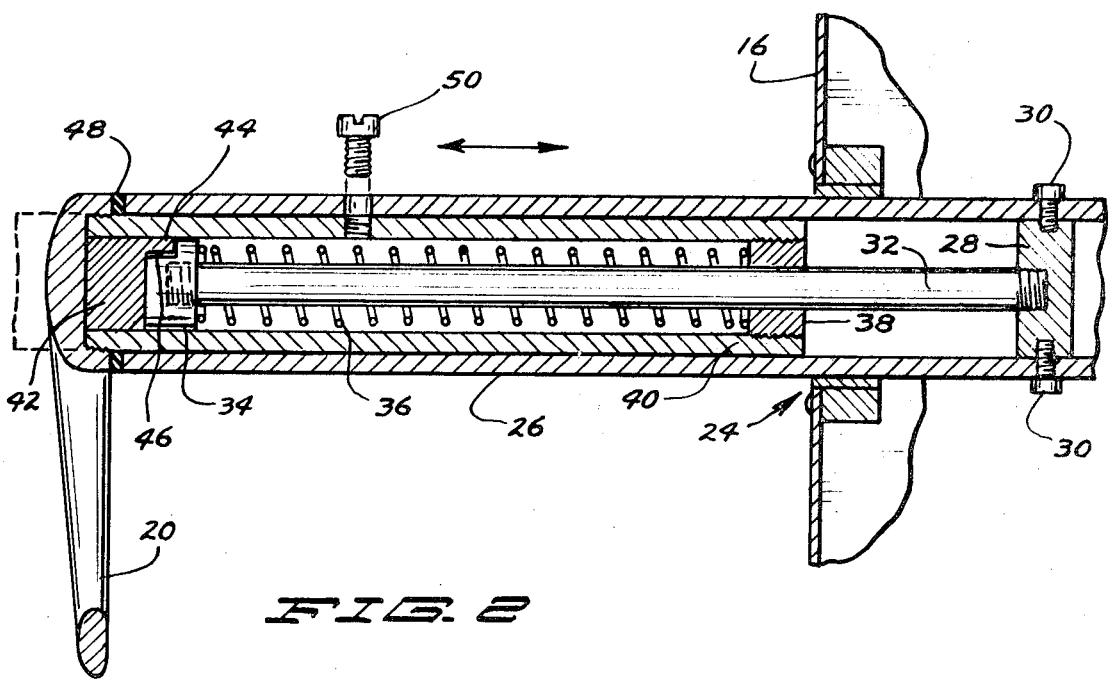
INVENTOR
EGON MARTE
BY
Jabor W. Adams
ATTORNEY

OVERRIDE DUAL CONTROL DEVICE FOR AIRCRAFT

This invention relates to aircraft controls used for training student pilots and the provision of a dual control system therein which will minimize the risk to the aircraft occupants should the instructor have to take over full control of the plane. Student pilots frequently lose their nerve and become panicked, and at such times, tend to pull their control yoke or control wheel back and hold it tightly against their chest. Pulling the control unit all the way back in an aircraft will put he aircraft into such a steep climb that a stall will occur, which frequently results in a crash. The student with the control wheel clutched to himself will become even more panicked and hysterical during the stall as the plane goes out of control, and it will not occur to the student to release the control yoke or wheel to the more experienced hands of the instructor. The instructor has a difficult time obtaining control from a student who has panicked because of the relative strength of the hysterical student and because his own control wheel is in an awkward mechanical position. This invention provides a yieldable control unit for an aircraft which will allow the instructor to override the student's control and push his control yoke into the proper operating position and control the plane while the student's control yoke remains inoperable.

Therefore, it is an object of this invention to provide a dual control system for an aircraft which will allow an instructor pilot to override the efforts of a panicked student pilot and take over full control of the plane.

It is a further object of this invention to provide a yieldable control system actuator for a student pilot which will yield to an instructor pilot who will retain control of the aircraft against the tension of the yieldable actuator.

These and other objects and advantages of this invention will be apparent from the following description made in connection with the accompanying drawings wherein like reference characters refer to similar parts throughout the several views, and in which:

FIG. 1 is an inside view of the cockpit of an aircraft embodying my invention.

FIG. 2 is a cross section on line 2—2 of FIG. 1 showing the internal construction of a student's control system according to my invention.

The entire cockpit portion of an aircraft embodying my invention is generally designated by reference numeral 10. The instructor pilot controls the aircraft by the use of control system actuator or wheel 12, which is connected to a control shaft 14. The control shaft 14 is operated in and out axially along its length and rotationally to perform the control operation of the aircraft. The shaft 14 extends through the instrument console 16 through an appropriate sliding connection. Remaining portions of the control system are shown diagrammatically in dotted line portion 18 extending behind the control console of the aircraft. The studen's control system actuator or wheel 20 is shown in its normal operating position which is equivalent to that of the instructor's wheel. In dotted line position 22, the studen's wheel is shown in the position in which the student would hold it while in a panicked or hysterical state, at which time the instructor's wheel could be operated to occupy a more normal position, such as is shown in FIG. 1.

In FIG. 2, the student's control actuator is shown in its normal or retracted position. The appropriate control shaft guide, generally designated by reference numeral 24 in the control panel of the aircraft, may be of standard construction well known in the art to provide a sliding connection. The basic control shaft extending into and being part of the conventional aircraft controls is being designated by reference numeral 26. Inside control shaft 26 is rigidly mounted a plate 28 by screws 30 or any other suitable rigid mounting means. Attached to plate 28 is a rod 32 which extends to a spring backing plate 34 mounted at its other end. The spring backing plate 34 provides a rigid support for the thrust of spring 36. The other end of spring 36 is in contact with thrust plate 38 which is mounted at one end of shaft 40 which is slidably mounted within column 26. The thrust plate 38 has a sliding surface in contact with rod 32 to permit free movement therealong. Similarly, shaft 40 may move freely inside column 26. The student's control actuator or wheel 20 is mounted at the other end of the shaft 40, from the thrust plate. The student's control wheel has an internal hub 42 with a tooth 44 which engages socket 46 on the spring backup plate 34. A suitable dust and moisture sealing element 48 may be placed between the student's wheel and the aircraft control column 26. A locking bolt 50 may be provided to lock the column and shaft together.

In normal operation, the pressures required to operate the aircraft control system using movements in and out on the control column may be less than 10 pounds, for example. The spring 36 is of such a design that it will provide no yield at these minimum pressures and will hold the student's control unit actuator 20 rigidly against the aircraft's control column 26. However, should the student become panicked and draw the unit towards him, the instructor may regain control of the aircraft by using pressures in excess of that normally required to operate the aircraft control. By pushing forward with a pressure of, for example, 30 or 40 pounds, the instructor may push his control unit away from him and return the plane to normal operation while the student's control unit may remain near his body. At this time, while the student is holding his wheel rigidly and the instructor is pushing his wheel away from him, the spring 36 is compressed between spring backing plate 34 and thrust plate 38. The control shaft 26 extending to the aircraft controls moves back into the normal position under the intructor's control and the shaft 40 associated with the student+s control 20 remains stationary in the student's hands. It will also be appreciated that hub 42 becomes separated from backing plate 34, thus, rendering the student unable to control the aircraft by rotational movement of his control unit. Thus, the instructor can have full steering control of the aircraft and by the use of sufficient force to compress the spring 36, will have in and out control of the control column without having to actually overpower the panicked student.

This control system provides numerous safety advantages for both pilot and student in the operation of an instructional aircraft in that the panicked or hysterical student will not cause the crash and destruction of the aircraft. The yieldable element in the sutdent's control column may be of any type so long as the basic principle is observed that is not yield during normal operating conditions of the aircraft control system, but will yield much more easily than the amount of strength required to overcome the hysterical student.

It is also clear that both control units of an aircraft may be provided with an override dual control, according to my invention, so that the instructor can sit in either position in the aircraft while the student sits at the other position. It is relatively easy to provide a locking action which will inactivate a unit so that it will remain rigid at all times. Or, when the aircraft is in normal use with two pilots and the student is not in the plane, both units may be locked. It is also clear that it would be easy to install a control unit of this type in an already manufactured aircraft. In this event, the control unit kit would be provided with a sleeve to be inserted in the aircraft control column and which would provide a sliding connection with the shaft 40 for the student's control wheel.

It will, of course, be understood that various changes may be made in the form, details, arrangement and proportion of the parts without departing from the scope of the invention, which generally stated, consists in the matter set forth in the accompanying claims.

What is claimed is:

1. A single manual control system for controlling an airplane in flight comprising,
   a pair of manually operable actuators for said control system,
   a gripping member for each of said actuators,
   a telescoping connection between one of said actuators and its gripping member,
   yieldable spring mans interposed in said connection and resisting the telescoping movement of said connection during normal control system operation but yielding under sufficient force exerted by the other operator to render said releasable actuator inoperative.

2. The apparatus of claim 1 wherein said telescoping connection comprises a hollow column associated with said actuator and a shaft slidably mounted in said column and attached to said gripping member.

3. The apparatus of claim 2 wherein said shaft is hollow and said spring means comprise,
- a spring backup plate rigidly connected with said column and positioned within said hollow shaft,
- a spring thrust plate rigidly connected with said shaft, said spring mans being positioned between said backup plate and said thrust plate.

4. The apparatus of claim 3 wherein said backup plate has a tooth-receiving recess therein, and a tooth on said gripping member adapted to be received in driving engagement in said recess to provide rotational control of said column by said gripping member when in normal position but removing said tooth from said recess upon a predetermined increment of telescopic movement of said shaft in said column.

5. The apparatus of claim 1 and means for locking the column and shaft together to prevent telescopic movement thereof.

6. The apparatus of claim 1 and a tooth on said gripping member for operative engagement with said actuator to provide rotational control of said actuator by said gripping member when in a normal position but releasing rotational control upon telescoping movement of said connection.

* * * * *